United States Patent
Yeh

(10) Patent No.: US 8,943,289 B2
(45) Date of Patent: Jan. 27, 2015

(54) DATA MOVING METHOD FOR FLASH MEMORY MODULE, AND MEMORY CONTROLLER AND MEMORY STORAGE APPARATUS USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 556 days.

(21) Appl. No.: 13/309,570

(22) Filed: Dec. 2, 2011

(65) Prior Publication Data

US 2013/0060990 A1 Mar. 7, 2013

(30) Foreign Application Priority Data

Sep. 6, 2011 (TW) .............................. 100132133 A

(51) Int. Cl.
  *G06F 13/00* (2006.01)
  *G06F 13/28* (2006.01)
  *G06F 12/02* (2006.01)
(52) U.S. Cl.
  CPC .................................. *G06F 12/0246* (2013.01)
  USPC ................... 711/165; 711/103; 711/E12.002; 707/693; 707/824
(58) Field of Classification Search
  USPC ........... 711/165, 103, E12.002; 707/693, 824
  See application file for complete search history.

(56) References Cited

U.S. PATENT DOCUMENTS

| 2005/0172065 A1* | 8/2005 | Keays | 711/103 |
| 2009/0300318 A1* | 12/2009 | Allen et al. | 711/206 |
| 2010/0223420 A1* | 9/2010 | Ahn et al. | 711/103 |
| 2011/0055458 A1* | 3/2011 | Kuehne | 711/103 |
| 2012/0110239 A1* | 5/2012 | Goss et al. | 711/103 |
| 2012/0216094 A1* | 8/2012 | Yoo et al. | 714/758 |
| 2013/0007381 A1* | 1/2013 | Palmer | 711/154 |
| 2013/0103889 A1* | 4/2013 | Jeong | 711/103 |

* cited by examiner

Primary Examiner — Edward Dudek, Jr.
(74) Attorney, Agent, or Firm — Jianq Chyun IP Office

(57) ABSTRACT

A method of moving a first portion of data and a second portion of data, which belong to one page data and respectively stored in a second physical page and a third physical page, into a first physical page in a flash memory module is provided. The method includes transmitting a read command for reading page data stored in the second physical page; reading the first portion of data from a buffer area of the rewritable non-volatile memory module into a buffer memory; transmitting a read command for reading page data stored in the third physical page; transmitting the first portion of data from the buffer memory to the buffer area; and transmitting a write command for writing data stored in the buffer area into the first physical page. Accordingly, the method can effectively move one page data dispersedly stored in different physical pages into one physical page.

24 Claims, 15 Drawing Sheets

US 8,943,289 B2

DATA MOVING METHOD FOR FLASH MEMORY MODULE, AND MEMORY CONTROLLER AND MEMORY STORAGE APPARATUS USING THE SAME

CROSS-REFERENCE TO RELATED APPLICATION

This application claims the priority benefit of Taiwan application serial no. 100132133, filed on Sep. 6, 2011. The entirety of the above-mentioned patent application is hereby incorporated by reference herein and made a part of this specification.

BACKGROUND

1. Technology Field

The present invention relates to a data moving method for a flash memory module, a memory controller using the method, and a memory storage apparatus using the method.

2. Description of Related Art

Digital cameras, mobile phones, and MP3 music players have undergone rapid growth in recent years, so that consumer demand for storage media has also drastically increased. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, such as a mobile phone, a personal digital assistant (PDA), a notebook computer, and so on. For instance, a conspicuous solid state drive (SSD) is a storage apparatus which utilizes a flash memory as its storage medium. Therefore, the flash memory industry has become a very popular part of the electronic industry in recent years. A flash memory module has a plurality of physical blocks, and each of the physical blocks has a plurality of physical pages, wherein data must be written into a physical block according to the sequence of the physical pages in the physical block. In addition, a physical page containing data has to be erased before it is used for a new data writing operation. Particularly, each physical block is the smallest erasing unit, and each physical page is the smallest programming (i.e., writing) unit.

Hence, in order to improve the operation efficiency, a memory controller of a memory storage apparatus groups the physical blocks of a flash memory module into a data area and a spare area.

Physical blocks in the data area are used for storing data written by a host system. To be more specific, a memory management circuit converts a logical access address accessed by the host system into a logical page of a logical block and maps the logical pages of the logical blocks to physical pages of the physical blocks in the data area. Namely, in the management of a flash memory module, the physical blocks in the data area are deemed used physical blocks (for instance, the physical blocks already contain data written by a host system). Additionally, the memory management circuit records the mapping relationship between the logical blocks and the physical blocks of the data area in a logical block-physical block mapping table, and the logical pages of each logical block are sequentially mapped to the physical pages of the corresponding physical block.

Physical blocks in the spare area are used for substituting the physical blocks in the data area. In particular, a physical block already containing data has to be erased before it is used for a new data writing operation, and thus the physical blocks in the spare area are used for writing updated data to substitute the physical blocks originally mapped to the logical blocks. Hence, the physical blocks in the spare area are either blank blocks or available blocks (i.e., these blocks do not contain data, or these blocks contain data marked as invalid data).

That is to say, when the storage space of the memory storage apparatus is formatted, the physical blocks in the data area are mapped to the logical blocks and considered already containing update data. Subsequently, when the host system is about to store data into a logical page of a logical block, the memory controller selects a physical block from the spare area and writes the data into a physical page of the selected physical block, so as to complete the data update at the logical page.

Along with the development of semiconductor technologies, the page capacity of each physical page in a flash memory module has been increasing. For instance, each physical page in an existing flash memory module is usually designed to store 8 kilobytes (KB) of user data (i.e., the page capacity is 8 KB). However, an operating system (OS) of a host system (e.g., a personal computer) usually stores data in a smaller unit (e.g., 4 KB). For instance, the OS may merely update the preceding 4 KB of data at one logical page. After other access operations are done, the OS then updates the succeeding 4 KB of data in this logical page. Hence, the updated data belonging to the same logical page may be stored in several physical pages. For instance, when the preceding 4 KB of data in one logical page is updated, the updated 4 KB of data and the invalid 4 KB of data are written into one physical page. When the succeeding 4 KB of data in this logical page is updated, the invalid 4 KB of data and the updated succeeding 4 KB of data are written into another physical page. Afterwards, when the data in the logical page need be arranged, the updated data of this logical page is read from the physical pages and written into a blank physical page. Accordingly, how to effectively move the data belonging to the same logical page from the physical pages to a blank physical page for improving the performance of the memory storage apparatus has become one of the major subjects in the industry.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

Accordingly, the present invention is directed to a data moving method capable of effectively moving a page data dispersedly stored in different physical pages in a flash memory module into one physical page.

The present invention is further directed to a memory controller that can effectively move a page data dispersedly stored in different physical pages of a flash memory module into one physical page.

The present invention is further directed to a memory storage apparatus that can effectively move a page data dispersedly stored in different physical pages into one physical page.

According to an exemplary embodiment of the present invention, a data moving method is provided for moving first page data, which is stored in a flash memory module having a plurality of physical pages, into a first physical page among the physical pages. The flash memory module has a first buffer area. A capacity of the first buffer area is equal to a capacity of each of the physical pages. The first page data has a first portion of data and a second portion of data. The first portion of data is stored in a second physical page among the physical pages, and the second portion of data is stored in a third physical page among the physical pages. The data moving method includes: (a) transmitting a first read command to the flash memory module, wherein the first read command indicates reading a page data stored in the second physical page and the flash memory module reads the page data stored in the second physical page into the first buffer area of the flash memory module in response to the first read command. The data moving method also includes: (b) reading the first portion of data of the first page data from the first buffer area into a buffer memory, and (c) transmitting a second read command to the flash memory module, wherein the second read command indicates reading a page data stored in the third physical page and the flash memory module reads the page data stored in the third physical page into the first buffer area of the flash memory module in response to the second read command. The data moving method also includes: (d) transmitting the first portion of data of the first page data from the buffer memory to the first buffer area, and (e) transmitting a write command to the flash memory module, wherein the write command indicates writing the first page data temporarily stored in the first buffer area into the first physical page.

According to an exemplary embodiment of the present invention, a memory controller configured for controlling a flash memory module is provided. The flash memory module has a plurality of physical pages and a first buffer area, wherein a capacity of the first buffer area is equal to a capacity of each of the physical pages. This memory controller includes a host interface, a memory interface, a buffer memory, and a memory management circuit. The host interface is configured for coupling to a host system. The memory interface is configured for coupling to a flash memory module. The memory management circuit is coupled to the buffer memory, the host interface, and the memory interface. Besides, the memory management circuit is configured for moving a first page data stored in the flash memory module to a first physical page among the physical pages, wherein the first page data has a first portion of data and a second portion of data, the first portion of data is stored in a second physical page among the physical pages, and the second portion of data is stored in a third physical page among the physical pages. The memory management circuit transmits a first read command to the flash memory module, wherein the first read command indicates reading page data stored in the second physical page and the flash memory module reads the page data stored in the second physical page into the first buffer area of the flash memory module in response to the first read command. Besides, the memory management circuit reads the first portion of data of the first page data from the first buffer area into the buffer memory. And, the memory management circuit transmits a second read command to the flash memory module, wherein the second read command indicates reading page data stored in the third physical page and the flash memory module reads the page data stored in the third physical page into the first buffer area of the flash memory module in response to the second read command Furthermore, the memory management circuit transmits the first portion of data of the first page data from the buffer memory to the first buffer area and transmits a write command to the flash memory module, wherein the write command indicates writing the first page data temporarily stored in the first buffer area into the first physical page.

According to an exemplary embodiment of the present invention, a memory storage apparatus having a flash memory module, a connector, and a memory controller is provided. The flash memory module has a plurality of physical pages and a first buffer area, wherein a capacity of the first buffer area is equal to a capacity of each of the physical pages. The connector is configured for coupling to a host system. The memory controller has a buffer memory and is coupled to the flash memory module and the connector. Herein, the memory controller is configured for moving a first page data stored in the flash memory module to a first physical page among the physical pages, wherein the first page data has a first portion of data and a second portion of data, the first portion of data is stored in a second physical page among the physical pages, and the second portion of data is stored in a third physical page among the physical pages. Additionally, the memory controller transmits a first read command to the flash memory module, wherein the first read command indicates reading page data stored in the second physical page and the flash memory module reads the page data stored in the second physical page and writes the page data into the first buffer area of the flash memory module in response to the first read command. And, the memory controller reads the first portion of data of the first page data from the first buffer area into the buffer memory. Besides, the memory controller transmits a second read command to the flash memory module, wherein the second read command indicates reading page data stored in the third physical page and the flash memory module reads the page data stored in the third physical page into the first buffer area of the flash memory module in response to the second read command. Furthermore, the memory controller transmits the first portion of data of the first page data from the buffer memory to the first buffer area and transmits a write command to the flash memory module, wherein the write command indicates writing the first page data temporarily stored in the first buffer area into the first physical page.

Based on the above, according to the data moving method, the memory controller, and the memory storage apparatus described in the exemplary embodiments of the present invention, the page data dispersedly stored in different physical pages can be effectively moved into one physical page, so as to reduce the time needed for moving the data and improve the access efficacy.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
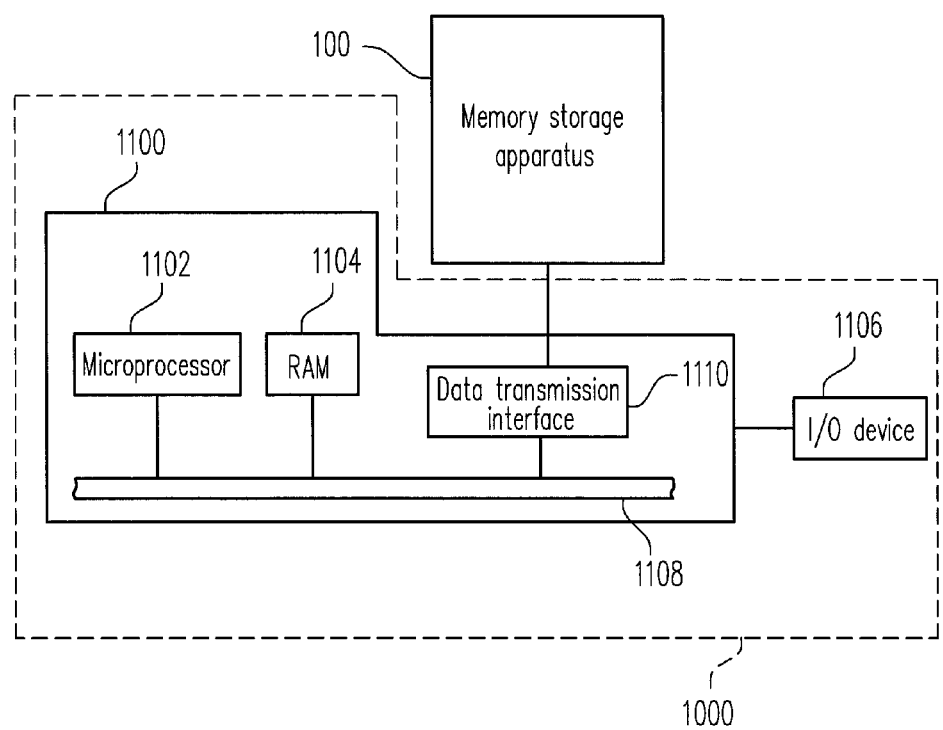
FIG. 1A illustrates a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

A memory storage apparatus (i.e., a memory storage system) typically includes a flash memory module and a controller (i.e., a control circuit). The memory storage apparatus is usually used together with a host system, such that the host system can write data into or read data from the memory storage apparatus.

FIG. 1A illustrates a host system and a memory storage apparatus according to a first exemplary embodiment of the present invention.

Figure 1B:
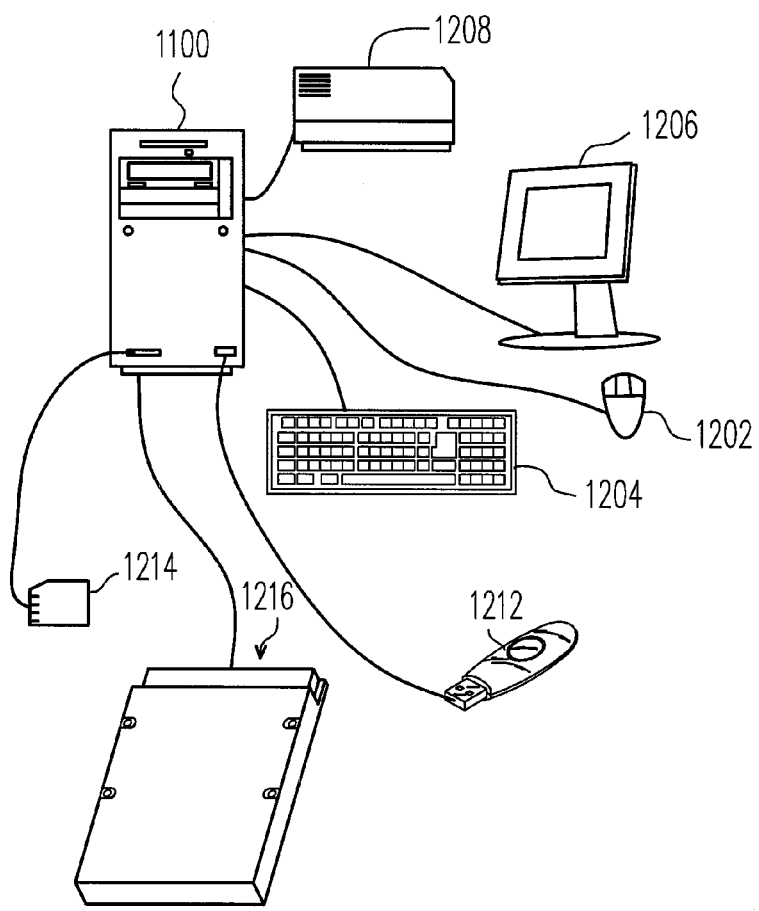
FIG. 1B schematically illustrates a computer, an input/output (I/O) device, and a memory storage apparatus according to the first exemplary embodiment of the present invention.

With reference to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be understood that the I/O device 1106 is not limited to the devices illustrated in FIG. 1B and may further include other devices.

In the exemplary embodiment of the present invention, the memory storage apparatus 100 is coupled to other devices of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1212, a memory card 1214, or a solid state drive (SSD) 1216 as shown in FIG. 1B.

Figure 1C:
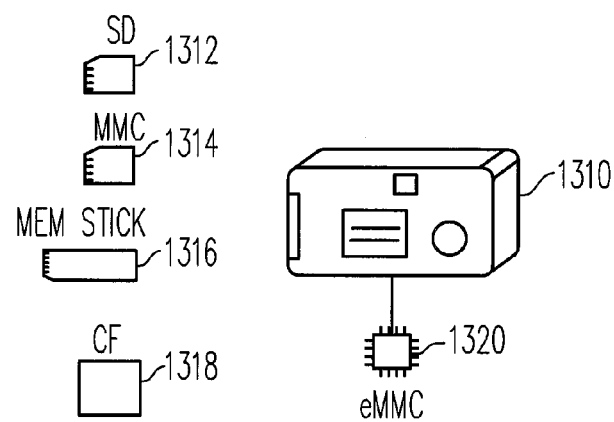
FIG. 1C schematically illustrates a host system and a memory storage apparatus according to another exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320 (as shown in FIG. 1C). The embedded storage device 1320 includes an embedded MMC (eMMC). It should be mentioned that the eMMC is directly coupled to the substrate of the host system.

Figure 2:
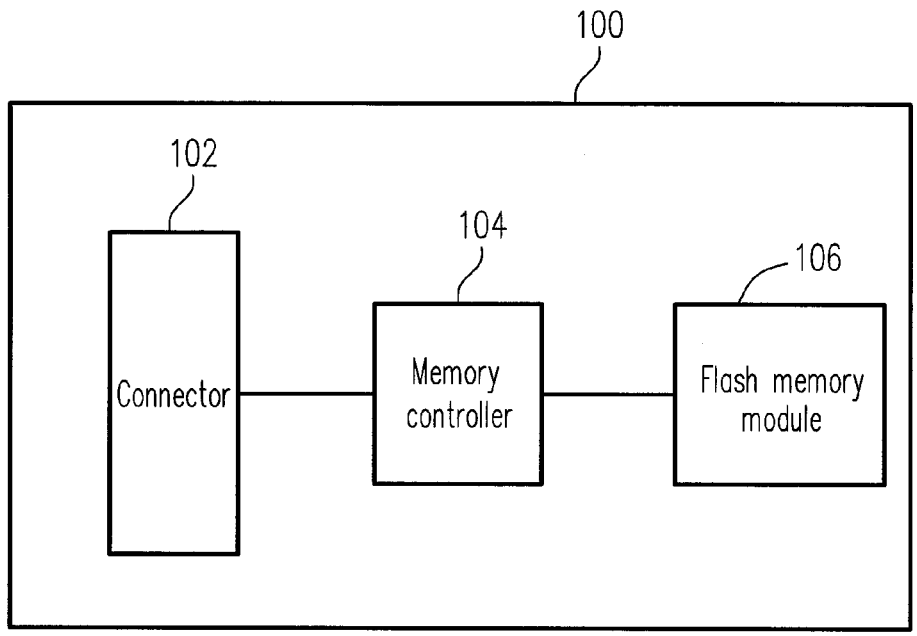
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a connector 102, a memory controller 104, and a flash memory module 106.

In the present exemplary embodiment, the connector 102 complies with the serial advanced technology attachment (SATA) standard. However, the present invention is not limited thereto, and the connector 102 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the secure digital (SD) standard, the memory sick (MS) standard, the multi media card (MMC) standard, the compact flash (CF) standard, the integrated device electronics (IDE) standard, or other suitable standards.

The memory controller 104 is configured for executing a plurality of logic gates or control instructions implemented in a form of hardware or firmware and performing various data operations in the flash memory module 106 according to commands issued by the host system 1000, such as data writing, reading, erasing, merging, and so on.

The flash memory module 106 is coupled to the memory controller 104 and configured for storing data written by the host system 1000. In the present exemplary embodiment, the flash memory module 106 is a multi-level cell (MLC) NAND flash memory module. However, the present invention is not limited thereto, and the flash memory module 106 may also be a single level cell (SLC) NAND flash memory module or other memory modules having the same characteristics.

Figure 3:
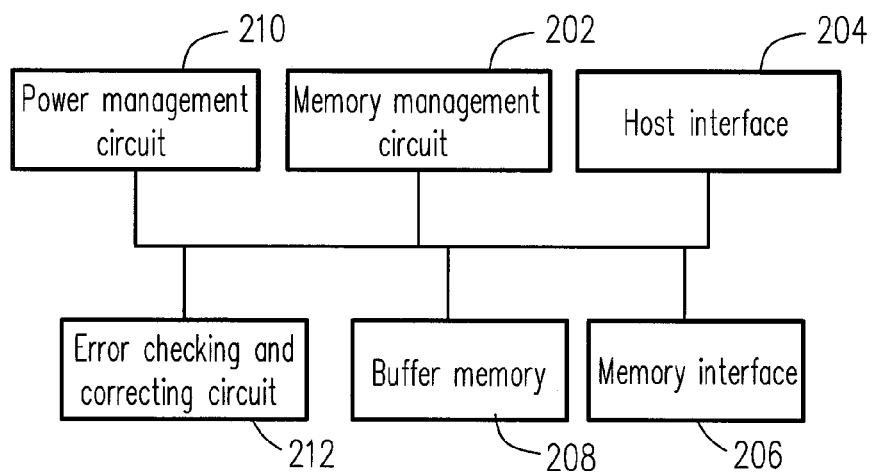
FIG. 3 is a schematic block diagram illustrating a memory controller according to the first exemplary embodiment of the present invention.

FIG. 3 is a schematic block diagram illustrating a memory controller according to the first exemplary embodiment of the invention.

With reference to FIG. 3, the memory controller 104 includes a memory management circuit 202, a host interface 204, a memory interface 206, and a buffer memory 208.

The memory management circuit 202 is configured for controlling the overall operation of the memory controller 104. To be more specific, the memory management circuit 202 has a plurality of control instructions. When the memory storage apparatus 100 is operated, the control instructions are executed to manage the physical blocks in the flash memory module 106 according to the block management method described in the present exemplary embodiment.

In the present exemplary embodiment, the control instructions of the memory management circuit 202 are implemented in a firmware form. For instance, the memory management circuit 202 has a microprocessor unit (not shown) and a read-only memory (not shown), and these control instructions are burned into the read-only memory. When the memory storage apparatus 100 is operated, the control instructions are executed by the microprocessor unit to write, read, and erase data.

In another exemplary embodiment of the present invention, the control instructions of the memory management circuit 202 are stored in a form of program codes in a specific area (e.g., the system area of the memory module exclusively used for storing system data) of the flash memory module 106. Additionally, the memory management circuit 202 may have a microprocessor unit (not shown), a read-only memory (not shown), and a RAM (not shown). Particularly, the read-only memory has a boot code, and when the memory controller 104 is enabled, the microprocessor unit executes the boot code to load the control instructions of the memory management circuit 202 stored in the flash memory module 106 into the RAM of the memory management circuit 202. The microprocessor unit then executes the control instructions to write, read, and erase data. Additionally, the control instructions of the memory management circuit 202 may also be implemented in a hardware form according to another exemplary embodiment of the present invention.

The host interface 204 is coupled to the memory management circuit 202 and configured for receiving and identifying commands and data transmitted by the host system 1000. Namely, the commands and data from the host system 1000 are transmitted to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 206 is coupled to the memory management circuit 202 and configured for accessing the flash memory module 106. Namely, data to be written into the flash memory module 106 is converted by the memory interface 206 into a format acceptable to the flash memory module 106.

The buffer memory 208 is coupled to the memory management circuit 202 and configured for temporarily storing data and commands from the host system 1000 or data from the flash memory module 106.

In the present exemplary embodiment, the memory controller 104 further includes a power management circuit 210 and an error checking and correcting circuit 212.

The power management circuit 210 is coupled to the memory management circuit 202 and configured for controlling the power of the memory storage apparatus 100.

The error checking and correcting circuit 212 is coupled to the memory management circuit 202 and configured for performing an error checking and correcting procedure to ensure data accuracy. Specifically, when the memory management circuit 202 receives a write command from the host system 1000, the error checking and correcting circuit 212 generates an error checking and correcting (ECC) code for data corresponding to the write command, and the memory management circuit 202 writes the data and the corresponding ECC code into the flash memory module 106. Subsequently, when the memory management circuit 202 reads the data from the flash memory module 106, the memory management circuit 202 simultaneously reads the ECC code corresponding to the read data, and the error checking and correcting circuit 212 executes the ECC procedure for the read data based on the corresponding ECC code.

Figure 4:
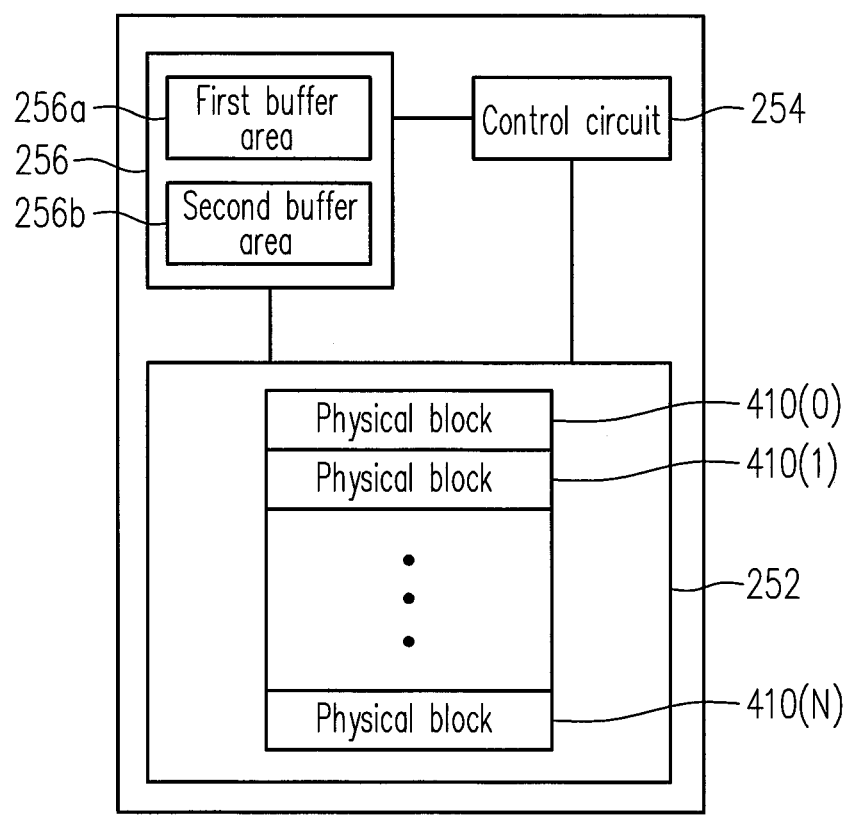
FIG. 4 is a schematic block diagram illustrating a flash memory module according to the first exemplary embodiment of the present invention.

FIG. 4 is a schematic block diagram illustrating a flash memory module according to the first exemplary embodiment of the present invention.

With reference to FIG. 4, the flash memory module 106 includes a memory cell array 252, a control circuit 254, and a data input/output (I/O) buffer 256.

The memory cell array 252 includes physical blocks 410(0)~410(N), each of the physical blocks has a plurality of physical pages, and the physical pages belonging to the same physical block can be written individually and must be erased simultaneously. For instance, in this exemplary embodiment, each of the physical blocks is constituted by 128 physical pages, and a capacity of each of the physical pages is 8 KB. However, the present invention is not limited thereto, and each of the physical blocks may also be comprised of 64, 256, or any other number of physical pages. In detail, each of the physical blocks is the smallest unit for erasing data. Namely, each of the physical blocks contains the least number of memory cells which are erased all together. Each of physical pages is the smallest unit for programming data. Namely, each of the physical pages is the smallest unit for writing data. Each physical page usually includes a data bit area and a redundant bit area. The data bit area is used for storing user data, and the redundant bit area is used for storing system data (e.g., error checking and correcting (ECC) codes).

The control circuit 254 is configured for programming data to the memory cell array 252 or reading data from the memory cell array 252 based on the commands from the memory controller 104.

The data I/O buffer 256 may include a first buffer area 256a and a second buffer area 256b. The first buffer area 256a and the second buffer area 256b are independent from each other and may respectively have individual capacity. For instance, the capacity of the first buffer area 256a and the capacity of the second buffer area 256b are respectively the same as the capacity of one physical page for temporarily storing the page data to be written into the memory cell array 202 or for temporarily storing the page data read from the memory cell array 202.

The process of writing data into the flash memory module 106 includes a data transmission stage and a data programming stage. In the data transmission stage, the memory management circuit 202 of the flash memory controller 104 transmits page data to be written into the first buffer area 256a, and this page data is then moved to the second buffer area 256b. In the data programming stage, this page data is programmed from the second buffer area 256b to the memory cell array 252. Specifically, after this page data is moved from the first buffer area 256a to the second buffer area 256b, the memory controller 204 receives from the flash memory module 106 a confirmation message indicating that the write command is completed, and the memory controller 204 may transmit (or issue) a next command to the flash memory module 106. Here, the first buffer area 256a is referred to as a data cache area, the second buffer area 256b is referred to as a page buffer area, and the writing operation with the second buffer area 256b is referred to as a cache program operation.

It should be mentioned that in this exemplary embodiment, the memory management circuit 206 of the flash memory controller 104 may instruct the flash memory module 106 not to write data into the second buffer area 256b. For instance, when there is no second buffer area 256b in the data I/O buffer 256, or when the second buffer area 256b is not used for data storage due to certain reasons, the flash memory module 106 may, based on a command from the memory management circuit 202, directly program page data to be written from the first buffer area 256a into the memory cell array 252. In another exemplary embodiment, the data I/O buffer 256 may have one or more than two buffer areas.

In this case, the memory management circuit 202 does not receive the confirmation message indicating that the write command is completed until the flash memory module 106 has programmed the page data from the first buffer area 256a to the memory cell array 252.

Figure 5:
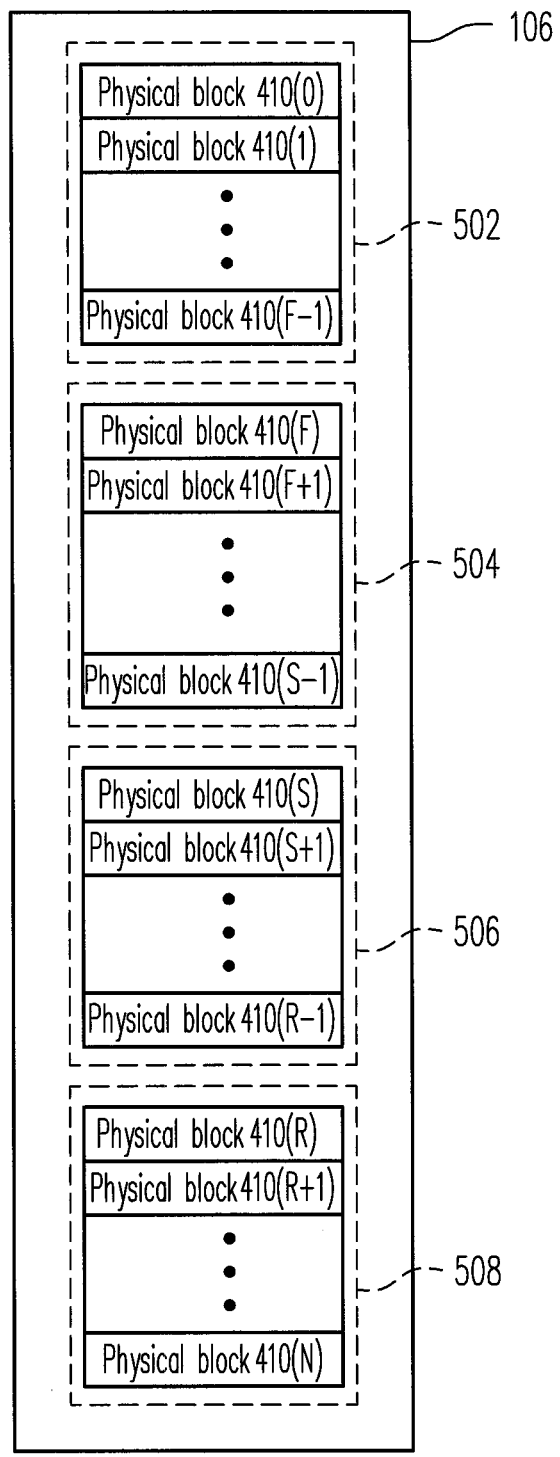
FIG. 5 and FIG. 6 are schematic diagrams illustrating management of physical blocks in a flash memory module according to the first exemplary embodiment of the present invention.
Figure 6:
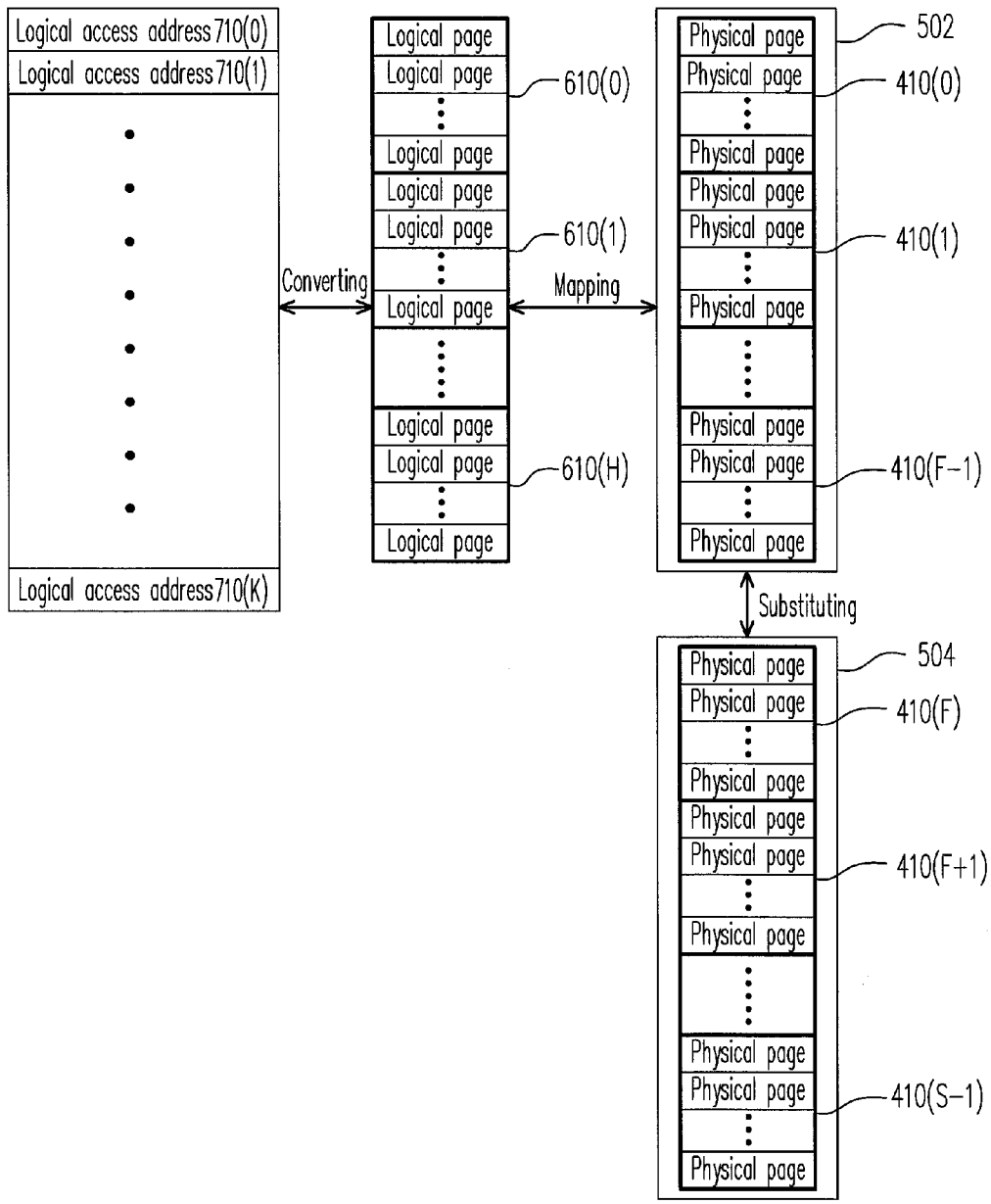

FIG. 5 and FIG. 6 are schematic diagrams illustrating management of physical blocks in a flash memory module according to the first exemplary embodiment of the present invention.

With reference to FIG. 5, the memory management circuit 202 of the memory controller 104 logically groups the physical blocks 410(0)~410(N) into a data area 502, a spare area 504, a system area 506, and a replacement area 508.

The physical blocks logically belonging to the data area 502 and the spare area 504 are used for storing data from the host system 1000. Specifically, the physical blocks (also referred to as data physical blocks) in the data area 502 are considered physical blocks already containing data, and physical blocks (also referred to as free physical blocks) in the spare area 504 are physical blocks used for a new data writing operation. For instance, when a write command and data to be written are received from the host system 1000, the memory management circuit 202 selects a physical block from the spare area 504 and writes the data into the selected physical block. In addition, when a data merging procedure is to be executed on a specific logical block, the memory management circuit 202 selects a physical block from the spare area 504 as a new data physical block corresponding to the logical block and writes data into the new data physical block. Then, the memory management circuit 202 re-maps the logical block to the new data physical block.

The physical blocks logically belonging to the system area 506 are used for recording system data. Here, the system data includes the manufacturers and models of the flash memory module, the number of physical blocks in the flash memory modules, the number of physical pages in each physical block, and so on.

Physical blocks logically belonging to the replacement area 508 are used in a bad physical block replacement procedure for replacing damaged physical blocks. Particularly, if there are still normal physical blocks in the replacement area 508 and a physical block in the data area 502 is damaged, the memory management circuit 202 selects a normal physical block from the replacement area 508 to replace the damaged physical block.

Based on the above, during the operation of the memory storage apparatus 100, the physical blocks associated with the data area 502, the spare area 504, the system area 506, and the replacement area 508 are dynamically changed. For instance, the physical blocks used for alternatively storing data are dynamically associated with the data area 502 or the spare area 504.

It should be mentioned that in the present exemplary embodiment, the memory management circuit 202 manages the flash memory module 106 in units of each physical block. However, the present invention is not limited thereto, and in another exemplary embodiment, the memory management circuit 202 may also group the physical blocks into a plurality of physical units and manage the flash memory module 106 in units of each physical unit. Each physical unit may be constituted by at least one physical block in the same sub memory module or in different sub memory modules, for instance. Besides, in another exemplary embodiment of the present invention, the physical blocks or the physical units may be grouped into several zones and may be respectively managed.

As indicated in FIG. 6, the memory management circuit 202 configures logical blocks 610(0)-610(H) for mapping to the physical blocks in the data area 502. Each of the logical blocks has a plurality of logical pages, and the logical pages are sequentially mapped to the physical pages in the corresponding data physical block. For example, when the memory storage apparatus 100 is formatted, the logical blocks 610(0)-610(H) are initially mapped to the physical blocks 410(0)-410(F−1) in the data area 502. Specifically, after the memory storage apparatus 100 is formatted, even though the data is not actually written into the physical blocks in the data area 502, the physical blocks are considered already containing the data.

According to an exemplary embodiment of the present invention, the memory management circuit 202 maintains a logical block-physical block mapping table to record the mapping relationship between the logical blocks 610(0)-610(H) and the physical blocks in the data area 502. In addition, the host system 1000 accesses data in units of each logical access address. For instance, a logical access address is a logical sector. When the host system 1000 accesses data, the memory management circuit 202 converts the logical access addresses 710(0)-710(K) corresponding to the memory storage apparatus 100 into addresses in the corresponding logical pages. For instance, when the host system 1000 is about to access a specific logical access address, the memory management circuit 202 converts the logical access address accessed by the host system 1000 into a multi-dimensional address composed of the corresponding logical block, the corresponding logical page, and the corresponding logical offset, and the memory management circuit 202 accesses data in the corresponding physical page according to the logical block-physical block mapping table. Here, an offset serves to define a logical (or a physical) address in a logical page (or a physical page), and the offset is defined as the distance between the logical (or the physical) address and the starting address of the logical page (or the physical page), wherein the logical (or the physical) address is also referred to as a logical (or a physical) offset address.

Figure 7:
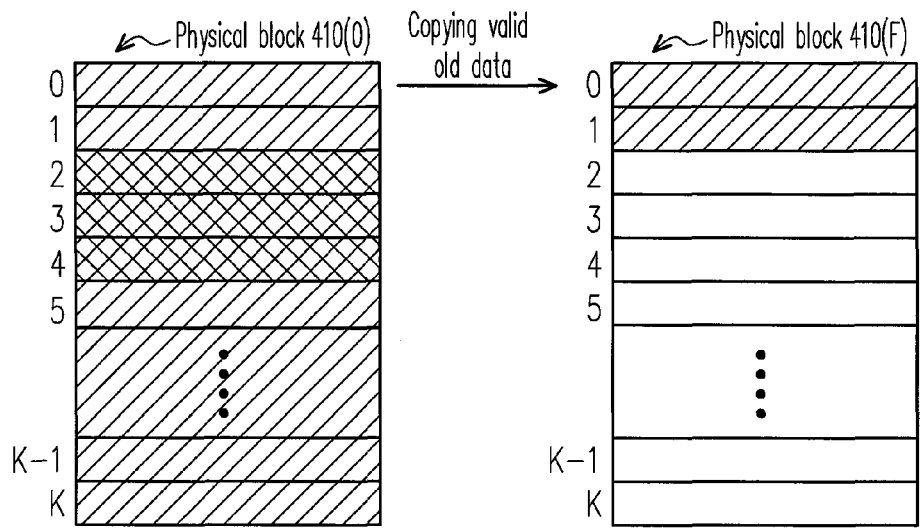
FIGS. 7~9 exemplarily illustrate that updated data are written into child physical blocks according to the first exemplary embodiment of the present invention.
Figure 8:
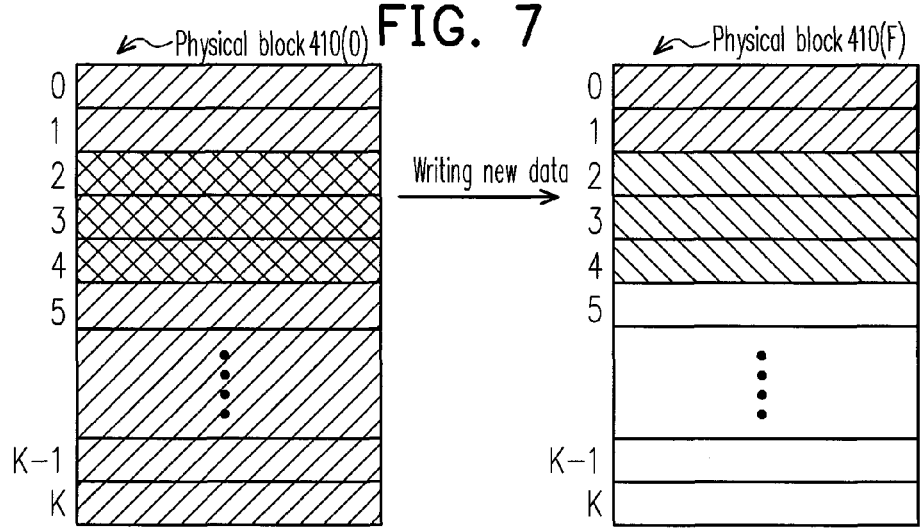
Figure 9:
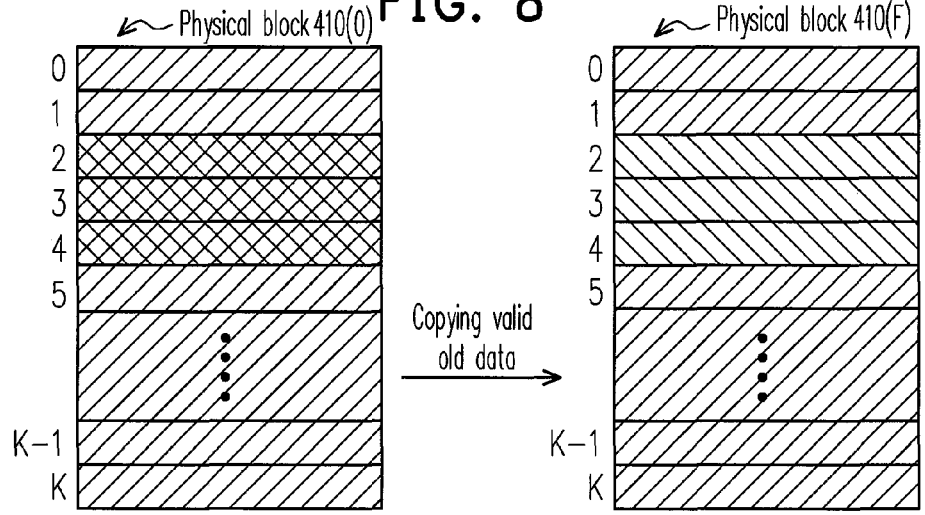

FIGS. 7~9 exemplarily illustrate that updated data are written into child physical blocks according to the first exemplary embodiment of the present invention.

With reference to FIGS. 7~9, for instance, when the logical block 610(0) is currently mapped to the physical block 410(0)

and the memory controller 104 receives a write command from the host system 1000 for writing data into the logical pages belonging to the logical block 610(0), the memory management circuit 202 identifies that the logical unit 610(0) is currently mapped to the physical block 410(0) based on the logical block-physical block mapping table and selects the physical block 410(F) from the spare area 504 as a substitute physical block for substituting the physical block 410(0). However, when the memory management circuit 202 writes the new data into the physical block 410(F), the memory management circuit 202 does not instantly move all the valid data in the physical block 410(0) into the physical block 410(F) or erase the physical block 410(0). To be specific, the memory management circuit 202 copies the valid data before the physical page to be written (i.e., data in the $0^{th}$ physical page and the $1^{st}$ physical page of the physical block 410(0)) to the $0^{th}$ physical page and the $1^{st}$ physical page of the physical block 410(F) (as shown in FIG. 7) and writes the new data into the $2^{nd}$ physical page to the $4^{th}$ physical page of the physical block 410(F) (as shown in FIG. 8). At this time, the memory management circuit 202 completes the writing operation. Since the valid data in the physical block 410(0) may become invalid during the next operation (e.g., a write command), instantly moving all the valid data in the physical block 410(0) to the physical block 410(F) may become meaningless.

In the present exemplary embodiment, the operation of maintaining such a temporary relationship is referred to as opening mother-child blocks. Besides, the original physical block (e.g., the physical block 410(0)) is referred to as a "mother physical block", and the substitute physical block (e.g., the physical block 410(F)) is referred to as a "child physical block". Here, one mother physical block and at least one child physical block corresponding thereto are collectively referred to as a mother-child block set.

Thereafter, the memory management circuit 202 integrates the data in the physical block 410(0) and the physical block 410(F) into one single physical block when the data of the two physical blocks are required to be merged, so that the efficiency of using physical blocks can be improved. Here, the operation of merging the mother-child blocks is referred to as a data merging operation or as closing mother-child blocks. For instance, as shown in FIG. 9, while closing the mother-child blocks, the memory management circuit 202 copies the remaining valid data in the physical block 410(0) (i.e., data stored in the $5^{th}$~$K^{th}$ physical pages of the physical block 410(0)) to the $5^{th}$~$K^{th}$ physical pages of the substitute physical block 410(F), and the memory management circuit 202 then erases the physical block 410(0), associates the erased physical block 410(0) with the spare area 504, and associates the physical block 410(F) with the data area 502. Namely, the memory management circuit 202 re-maps the logical block 610(0) to the physical block 410(F) in the logical block-physical block mapping table. Additionally, in the present exemplary embodiment, the memory management circuit 202 establishes a spare area physical block table (not shown) for recording the physical blocks currently associated with the spare area 504.

In addition to writing an update data by using a child physical block, the memory management circuit 202 in the present exemplary embodiment further selects at least one physical block from the spare area 504 as a random physical block to write the update data. For instance, given that the data in the logical page to be updated by the host system 1000 is already written into a child physical block, the update data is written into a random physical block, so that the data merging operation is not executed repeatedly.

Figure 10:
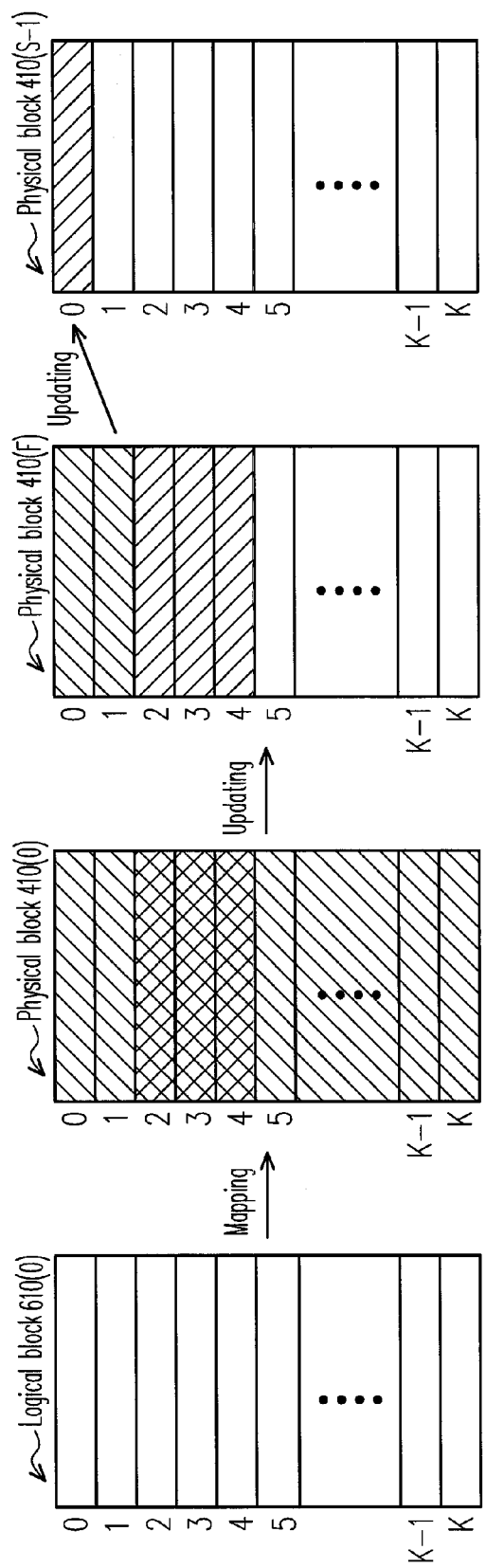
FIG. 10 schematically illustrates data written into child physical blocks and random physical blocks.

FIG. 10 schematically illustrates data written into child physical blocks and random physical blocks.

With reference to FIG. 10, if a physical block 410(S−1) is selected as a random physical block and the host system 1000 is about to write an update data into the $1^{st}$ logical page of the logical block 610(0) in the storage state illustrated in FIG. 8, the memory management circuit 202 writes the update data into the first blank physical page of the random physical block (e.g., the $0^{th}$ physical page of the physical block 410(S−1)).

In the present exemplary embodiment, when the current random physical block is full, the memory management circuit 202 selects another physical block from the spare area 504 as a new random physical block until the number of physical blocks in the spare area 504 is less than a predetermined value. In particular, the number of physical blocks in the spare area 504 is limited, and therefore the number of physical blocks which act as the random physical blocks is also limited. When the number of physical blocks in the spare area 504 is less than the predetermined value, the memory management circuit 202 executes the afore-mentioned data merging operation to erase those random physical blocks merely containing invalid data and associate the erased physical blocks with the spare area 504. Accordingly, when the next write command is executed, the memory management circuit 202 can again select a blank physical block as a random physical block from the spare area 504.

Figure 11:
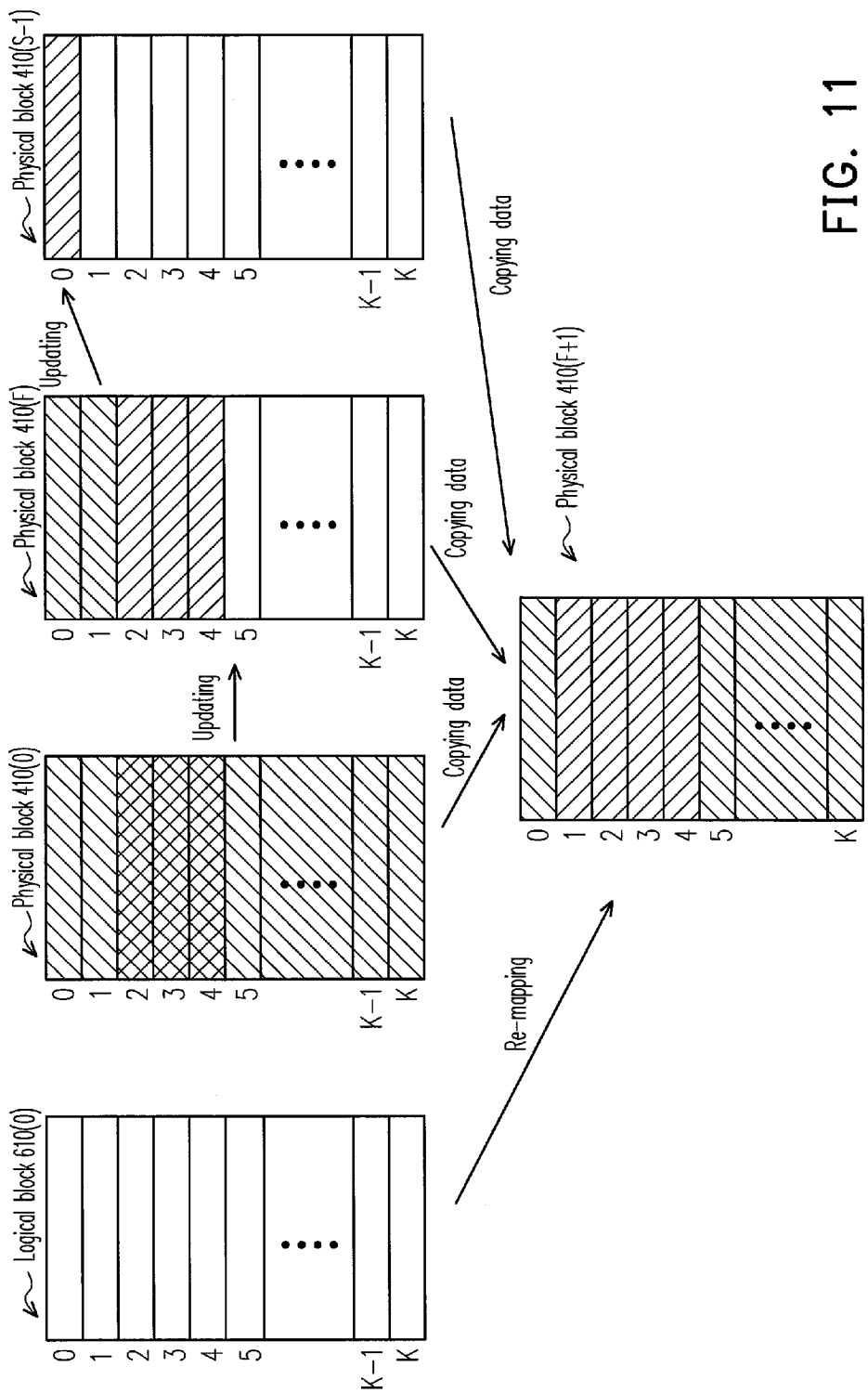
FIG. 11 exemplarily illustrates a data merging operation according to the first exemplary embodiment of the present invention.

FIG. 11 exemplarily illustrates a data merging operation according to the first exemplary embodiment of the present invention.

With reference to FIG. 11, given that the data merging operation is performed on the logical block 610(0) on the condition shown in FIG. 10, the memory management circuit 202 selects a blank physical block 410(F+1) from the spare area 504, copies the valid data belonging to the logical block 610(0) from the mother physical block 410(0), the child physical block 410(F), and the random physical block 410(S−1) to the physical block 410(F+1), and re-maps the logical block 610(0) to the physical block 410(F+1).

Specifically, in the process of copying the valid data, the data in the $0^{th}$ physical page of the physical block 410(0) is read and written into the $0^{th}$ physical page of the physical block 410(F+1). The data in the $1^{st}$ physical page of the physical block 410(S−1) is then read and written into the $1^{st}$ physical page of the physical block 410(F+1). The data in the $2^{nd}$ to $4^{th}$ physical pages of the physical block 410(F) are then sequentially read and written into the $2^{nd}$ to $4^{th}$ physical pages of the physical block 410(F+1). The data in the $5^{th}$ to $K^{th}$ physical pages of the physical block 410(0) are sequentially read and written into the $5^{th}$ to $K^{th}$ physical pages of the physical block 410(F+1).

It should be mentioned that the data is written in units of each physical page when the flash memory module 106 is programmed. If the size of the updated data belonging to a specific logical page is less than the capacity of one physical page, the memory management circuit 202 writes the updated data in a different way based on various conditions.

For instance, in an exemplary embodiment, the memory management circuit 202 may read the non-updated data from the physical page originally mapping to the logical page and write both the non-updated data and the updated data into a blank physical page. This is referred to as an arrangement of a valid page data.

Moreover, in another exemplary embodiment, the memory management circuit 202 may directly write the updated data into a physical page without arranging the valid page data. Particularly, the memory management circuit 202 writes the updated data into a physical page based on a logical offset address where the updated data is to be written, and the memory management circuit 202 labels a storage section of the physical page, which stores the updated data, as being valid.

Figure 12:
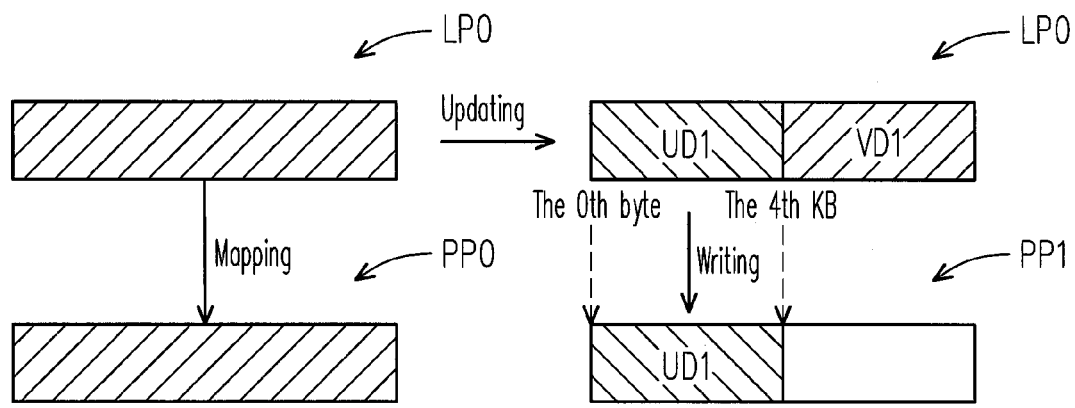
FIG. 12 exemplarily illustrates that updated data having the size less than the capacity of one physical page is written into a physical page according to the first exemplary embodiment of the present invention.

FIG. 12 exemplarily illustrates that updated data having the size less than the capacity of one physical page is written into a physical page according to the first exemplary embodiment of the present invention. For instance, the capacity of one physical page is 8 KB in this exemplary embodiment of the present invention, and thus the following description is made on the condition that the data to be written has the size less than 8 KB.

With reference to FIG. 12, for instance, if the logical page LP0 is originally mapped to the physical page PP0 (i.e., the data in the logical page LP0 is stored in the physical page PP0) and the host system 1000 is about to start storing the updated data UD1 having the size of 4 KB into the $0^{th}$ byte of a logical page LP1 in a specific logical block, the memory management circuit 202 selects a physical page PP1 of a physical block, starts writing the updated data UD1 into the $0^{th}$ byte of the physical page PP1, and labels the storage section where the updated data UD1 is stored as the valid storage section. Specifically, the memory management circuit 202 does not move the valid data VD1 belonging to other offset addresses of the logical page LP0 from the physical page PP0 to the physical page PP1. Namely, the memory controller 104 does not arrange the valid page data but directly writes the updated data into the physical page, and thereby the speed of writing data into the physical block can be effectively increased.

It should be mentioned that the data is programmed in units of each physical page in the flash memory module 106, as described above. Therefore, in the exemplary embodiment shown in FIG. 12, after the updated data UD1 is transmitted to the flash memory module 106, the updated data UD1 and a meaningless data temporarily stored in the first buffer area 256a of the flash memory module 106 (i.e., the data originally stored in the first buffer area 256a) are together moved to the second buffer area 256b and written into a physical page. Here, the meaningless data does not necessarily belong to the logical page LP0. Namely, the updated data UD1 is transmitted to the preceding 4 KB of addresses in the first buffer area 256a. At this time, the updated data UD1 is stored in the preceding portion of the first buffer area 256a, and the succeeding portion of the first buffer area 256a contains the data originally stored in the first buffer area 256a. After that, the meaningless data originally stored at the succeeding 4 KB of addresses in the first buffer area 256a is together moved to the second buffer area 256b and written into a physical page. In another exemplary embodiment, the data in the first buffer area 256a may also be directly written into a physical page.

As described above, when a write command is executed to merely update a portion of data in a logical page, the valid page data in the logical page is dispersedly stored into a plurality of physical pages. Thereby, when the data merging operation is performed, the memory management circuit 200 needs to move the valid page data of the logical page from the physical pages to a blank physical page.

Figure 13:
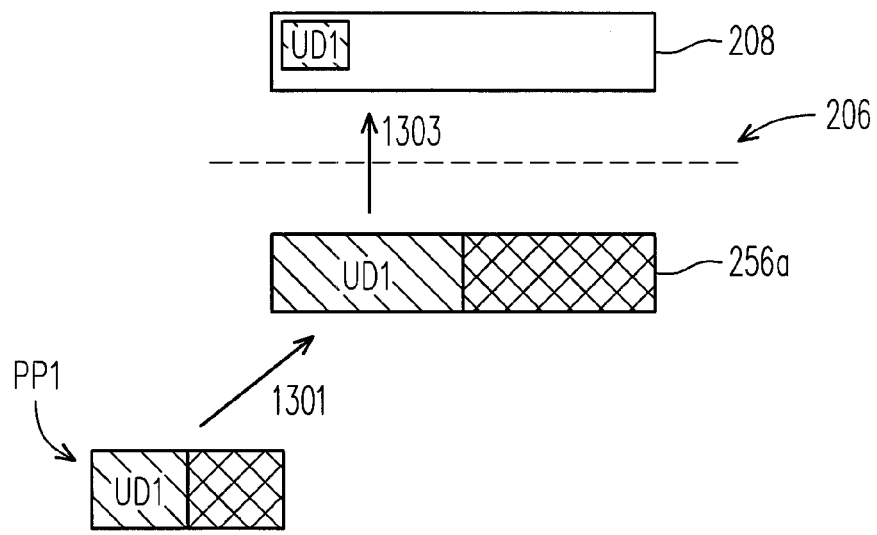
FIGS. 13~15 schematically illustrate that a valid page data belonging to a logical page is moved from physical pages to a blank physical page according to the first exemplary embodiment of the present invention.
Figure 14:
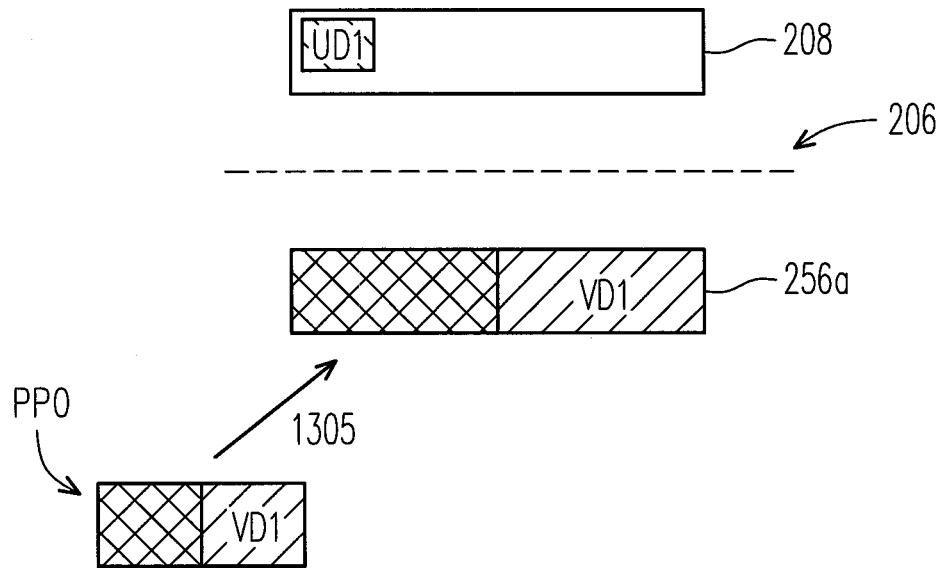
Figure 15:
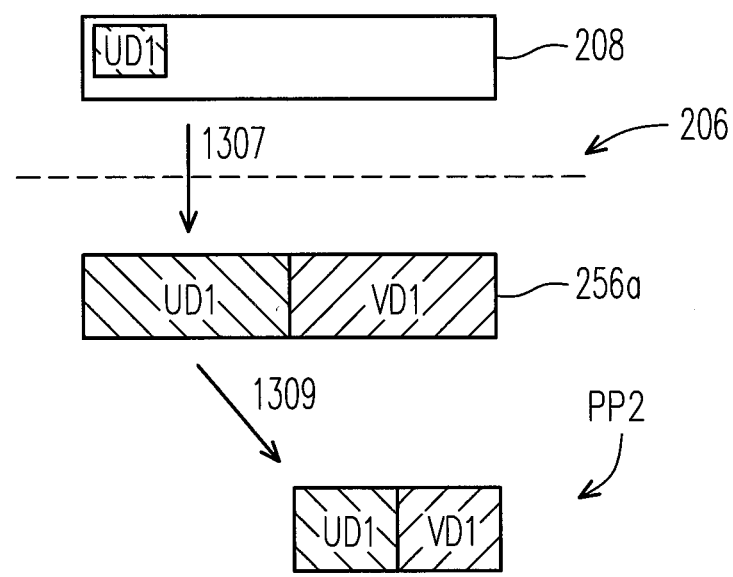

FIGS. 13~15 schematically illustrate that valid page data belonging to a logical page is moved from physical pages to a blank physical page according to the first exemplary embodiment of the present invention. It is assumed that the valid data at the preceding 4 KB of addresses in the logical page LL0 (hereinafter referred to as the first portion of data) is stored at the preceding 4 KB of addresses in the physical page PP1, and the valid data at the succeeding 4 KB of addresses in the logical page LL0 (hereinafter referred to as the second portion of data) is stored at the succeeding 4 KB of addresses in the physical page PP0. Besides, the valid page data belonging to the logical page LL0 is required to be merged to the physical page PP2.

With reference to FIG. 13, the memory management circuit 202 issues a read command (also referred to as a copyback read command) for reading page data in the physical page PP1 to the flash memory module 106. After receiving the read command, the control circuit 254 of the flash memory module 106 reads the page data in the physical page PP1 into the first buffer area 256a (a data stream 1301), and the memory management circuit 202 reads the preceding 4 KB of data UD1 from the first buffer area 256a into the buffer memory 208 (a data stream 1303). For instance, the memory management circuit 202 reads the valid data (i.e., the data UD1) in the physical page PP1 based on the marking of the valid storage section in the physical page PP1.

With reference to FIG. 14, the memory management circuit 202 issues a read command (also referred to as a copyback read command) for reading page data in the physical page PP0 to the flash memory module 106. After receiving the read command, the control circuit 254 of the flash memory module 106 reads the page data in the physical page PP0 into the first buffer area 256a (a data stream 1305).

With reference to FIG. 15, the memory management circuit 202 issues a write command (also referred to as a copyback write command) for programming the physical page PP2 to the flash memory module 106. Specifically, when issuing the write command of programming the physical page PP2, the memory management circuit 202 also transmits the data UD1 from the buffer memory 208 to the preceding 4 KB of addresses in the first buffer area 256a (a data stream 1307). After receiving the write command, the control circuit 254 of the flash memory module 106 moves the data (i.e., the data UD1 and the data VD1) in the first buffer area 256a into the second buffer area 256b and programs the data UD1 and the data VD1 from the second buffer area 256b to the physical page PP2 (a data stream 1309).

Note that while the control circuit 254 of the flash memory module 106 is programming the data UD1 and the data VD1 from the second buffer area 256b to the physical page PP2, the memory management circuit 202 may further issue a copyback read command to the flash memory module 106 in order to read data from other pages, as shown in FIG. 12 and FIG. 13.

Figure 16:
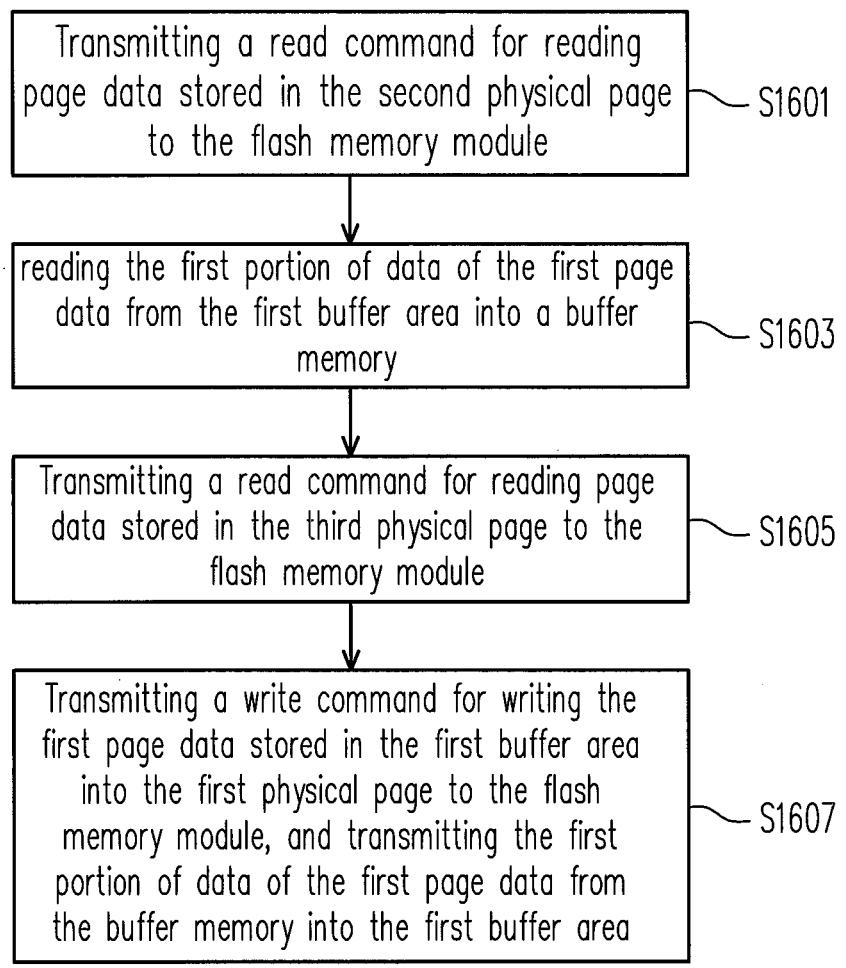
FIG. 16 is a flowchart illustrating a data moving method according to the first exemplary embodiment of the present invention.

FIG. 16 is a flowchart illustrating a data moving method according to the first exemplary embodiment of the present invention. Specifically, FIG. 16 shows that a page data (hereinafter referred to as a first page data) is moved from two physical pages (hereinafter referred to as a second physical page and a third physical page) to one physical page (hereinafter referred to as a first physical page) in the flash memory module 106.

With reference to FIG. 16, in step S1601, the memory management circuit 202 transmits a read command (hereinafter referred to as a first read command) for reading page data stored in the second physical page to the flash memory module 106, wherein the flash memory module 106 reads the page data stored in the second physical page into the first buffer area 256a in response to the first read command.

In step S1603, the memory management circuit 202 reads the first portion of data (e.g., the data UD1 depicted in FIG. 12) of the first page data from the first buffer area 256a into a buffer memory 208.

In step S1605, the memory management circuit 202 transmits a read command (hereinafter referred to as a second read command) for reading a page data stored in the third physical page to the flash memory module 106, wherein the flash memory module 106 reads the page data stored in the third physical page into the first buffer area 256a in response to the second read command.

In step S1607, the memory management circuit 202 transmits a write command for writing the first page data stored in the first buffer area 256a into the first physical page to the flash memory module 106, and transmits the first portion of data of the first page data from the buffer memory 208 into the first buffer area 256a. Here, the flash memory module 106 moves the first portion of data and the second portion of data (e.g., the data VD1 depicted in FIG. 14) of the first page data stored in the first buffer area 256a to the second buffer area 256b and programs the first page data from the second buffer area 256b to the first physical page. Specifically, as indicated above, after the first page data is moved from the first buffer area 256a to the second buffer area 256b, the memory management circuit 202 receives a confirmation message from the flash memory module 106 and then may continue to issue a new command to the flash memory module 106. Hence, the step S1601, the step S1603, or the step S1605 may be executed while the flash memory module 106 is being programmed. That is to say, the flash memory module 106 simultaneously receives data transmitted by the memory management circuit 202 and programs another data.

Note that even though the schematic diagrams in FIG. 13 to FIG. 15 and the flowchart in FIG. 16 exemplarily illustrate that 4 KB of data is respectively moved from two physical pages to one physical page, the present invention is not limited thereto. In another exemplary embodiment, the valid page data belonging to one logical page may be moved from more physical pages to one physical page, and the capacity of the moved data is not limited to be 4 KB.

For instance, in another exemplary embodiment, the first page data may further include a third portion of data between the first portion of data and the second portion of data, and the third portion of data is stored in a fourth physical page. Thereby, before the step S1605 is executed, the memory management circuit 202 further transmits a read command (hereinafter referred to as a third read command) for reading page data stored in the fourth physical page to the flash memory module 106. After the flash memory module 106 reads the page data stored in the fourth physical page into the first buffer area 256a, the memory management circuit 202 reads the third portion of data of the first page data from the first buffer area 256a into the buffer memory 208. Besides, in the step S1607, the memory management circuit 202 further transmits the third portion of data of the first page data from the buffer memory 208 to the first buffer area 256a. Thereby, the complete first page data can be moved from the first buffer area 256a to the second buffer area 256b and written into the first physical page.

In view of the above, the data that belongs to the same logical page and is dispersedly stored in a plurality of physical pages is integrated in the data I/O buffer 256 of the flash memory module 106 and directly written into one physical page. Accordingly, the speed of moving the data can be effectively increased. Moreover, the data in each physical page need not be read and written into the buffer memory 208. Hence, the occupied storage space of the buffer memory 208 is significantly reduced. Thereby, it is not necessary to install the buffer memory 208 with great capacity, which leads to the reduction of manufacturing costs of the memory storage apparatus.

[Second Exemplary Embodiment]

The second exemplary embodiment is substantially the same as the first exemplary embodiment, while the difference therebetween lies in that the memory management circuit 202 in the second exemplary embodiment can further perform an error correcting operation on the moved data. The drawings utilized to elaborate the first exemplary embodiment will further serve as references to describe the difference between the first exemplary embodiment and the second exemplary embodiment.

Figure 17:
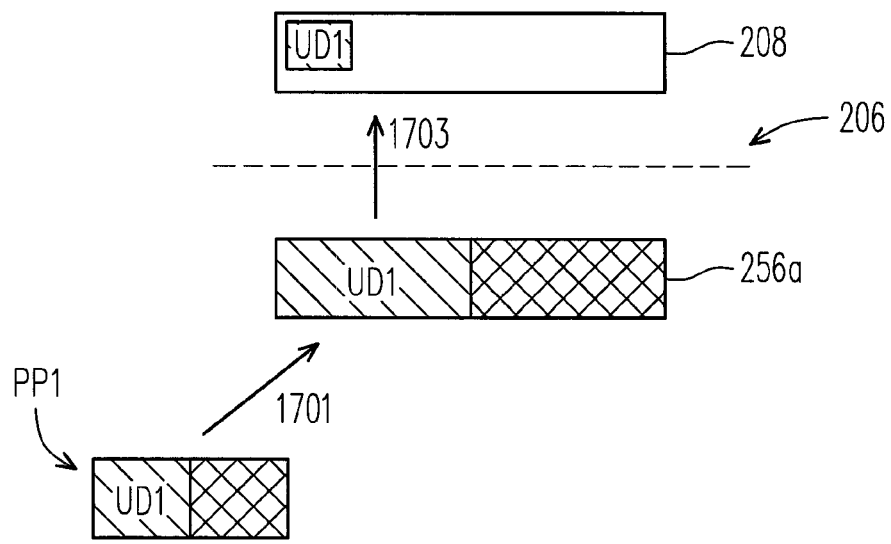
FIGS. 17~19 schematically illustrate that a valid page data belonging to a logical page is moved from physical pages to a blank physical page according to a second exemplary embodiment of the present invention.
Figure 18:
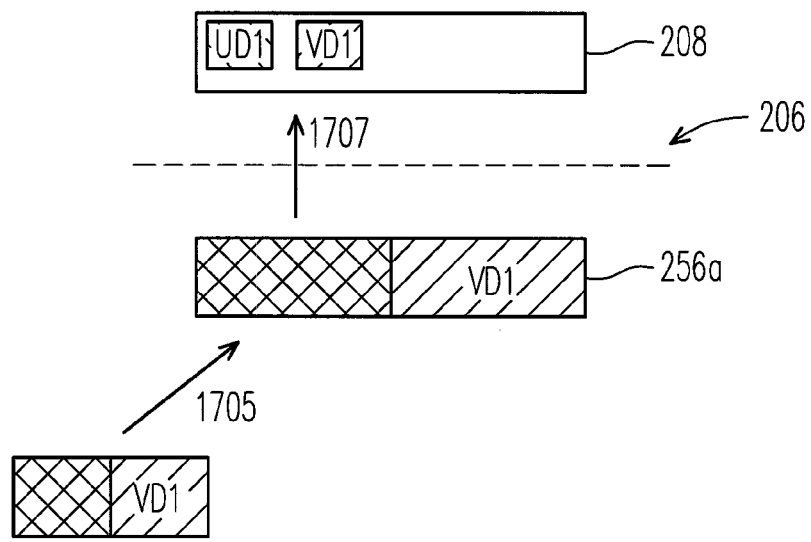
Figure 19:
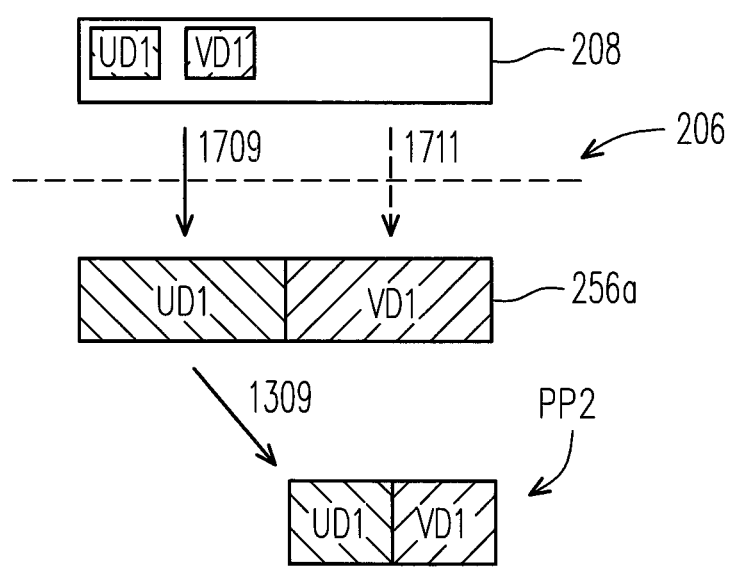

FIGS. 17~19 schematically illustrate that a valid page data belonging to a logical page is moved from physical pages to a blank physical page according to a second exemplary embodiment of the present invention. It is assumed that the valid data at addresses of the preceding 4 KB of data in the logical page LL0 (hereinafter referred to as the first portion of data) is stored at the preceding 4 KB of addresses in the physical page PP1, and the valid data at the succeeding 4 KB of addresses in the logical page LL0 (hereinafter referred to as the second portion of data) is stored at the succeeding 4 KB of addresses in the physical page PP0. Besides, the valid page data belonging to the logical page LL0 is required to be merged to the physical page PP2.

With reference to FIG. 17, the memory management circuit 202 issues a read command (also referred to as a copyback read command) for reading page data in the physical page PP1 to the flash memory module 106. After receiving the read command, the control circuit 254 of the flash memory module 106 reads the page data in the physical page PP1 into the first buffer area 256a (a data stream 1701), and the memory management circuit 202 reads the preceding 4 KB of data UD1 from the first buffer area 256a into the buffer memory 208 (a data stream 1703). In particular, after the preceding 4 KB of data UD1 is read from the first buffer area 256a, the memory management circuit 202 performs the error correcting operation on the data UD1 through the error checking and correcting circuit 212.

With reference to FIG. 18, the memory management circuit 202 issues a read command (also referred to as a copyback read command) for reading page data in the physical page PP0 to the flash memory module 106. After receiving the read command, the control circuit 254 of the flash memory module 106 reads the page data in the physical page PP0 into the first buffer area 256a (a data stream 1705), and the memory management circuit 202 reads the succeeding 4 KB of data VD1 from the first buffer area 256a into the buffer memory 208 (a data stream 1707). In particular, after the succeeding 4 KB of data VD1 is read from the first buffer area 256a, the memory management circuit 202 performs the error correcting operation on the data VD1 through the error checking and correcting circuit 212.

With reference to FIG. 19, the memory management circuit 202 issues a write command (also referred to as a copyback write command) for programming the physical page PP2 to the flash memory module 106. When issuing the write command of programming the physical page PP2, the memory management circuit 202 also transmits the data UD1 from the buffer memory 208 to the addresses of the preceding 4 KB of data in the first buffer area 256a (a data stream 1709). Specifically, given that the data UD1 that is originally read from the first buffer area 256a contains an error bit, the memory management circuit 202 transmits the corrected data UD1 to the first buffer area 256a. It should be mentioned that when the data VD1 originally read from the first buffer area 256a contains an error bit, the memory management circuit 202 further transmits the corrected data VD1 to the addresses of the succeeding 4 KB of data in the first buffer area 256a (a data stream 1711).

After receiving the write command, the control circuit 254 of the flash memory module 106 moves the data (i.e., the data UD1 and the data VD1) in the first buffer area 256a into the second buffer area 256b and programs the data UD1 and the data VD1 from the second buffer area 256b to the physical page PP2 (a data stream 1713).

Figure 20:
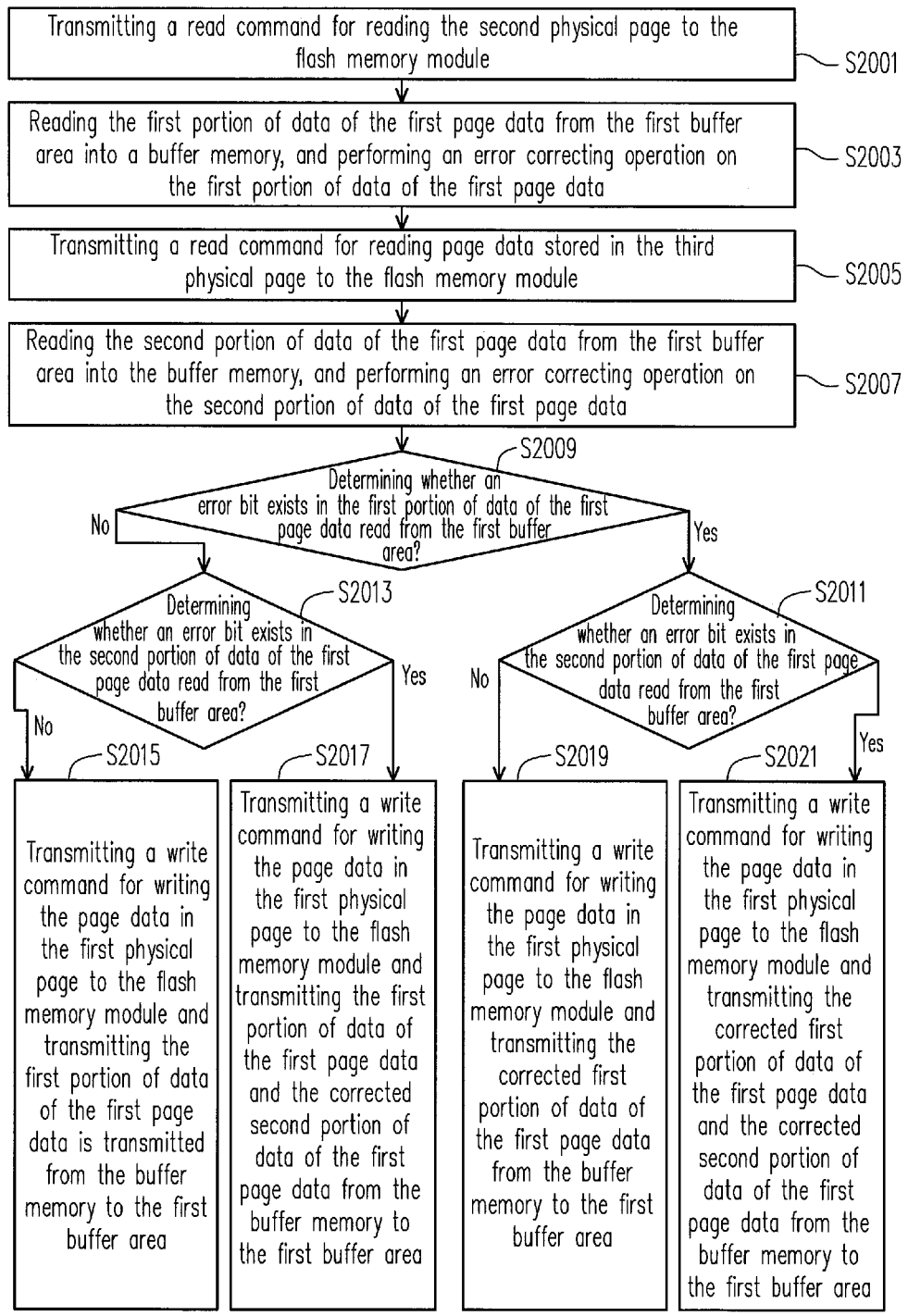
FIG. 20 is a flowchart illustrating a data moving method according to the second exemplary embodiment of the present invention.

FIG. 20 is a flowchart illustrating a data moving method according to the second exemplary embodiment of the present invention. Specifically, FIG. 20 shows that page data (hereinafter referred to as a first page data) is moved from two physical pages (hereinafter referred to as a second physical page and a third physical page) to one physical page (hereinafter referred to as a first physical page) in the flash memory module 106.

With reference to FIG. 20, in step S2001, the memory management circuit 202 transmits a read command (hereinafter referred to as a first read command) for reading page data in the second physical page to the flash memory module 106, wherein the flash memory module 106 reads the page data stored in the second physical page and writes the page data into the first buffer area 256a in response to the first read command.

In step S2003, the memory management circuit 202 reads the first portion of data (e.g., the data UD1 depicted in FIG. 16) of the first page data from the first buffer area 256a into a buffer memory 208, and performs an error correcting operation on the first portion of data of the first page data.

In step S2005, the memory management circuit 202 transmits a read command (hereinafter referred to as a second read command) for reading page data stored in the third physical page to the flash memory module 106, wherein the flash memory module 106 reads the page data stored in the third physical page into the first buffer area 256a in response to the second read command.

In step S2007, the memory management circuit 202 reads the second portion of data (e.g., the data VD1 depicted in FIG. 17) of the first page data from the first buffer area 256a into the buffer memory 208, and performs an error correcting operation on the second portion of data of the first page data.

In step S2009, the memory management circuit 202 determines whether an error bit exists in the first portion of data of the first page data read from the first buffer area 256a. In step S2011 and step 2013, the memory management circuit 202 determines whether an error bit exists in the second portion of data of the first page data read from the first buffer area 256a.

If it is determined that no error bit exists in the first and second portions of data of the first page data read from the first buffer area 256a, in step S2015, the memory management circuit 202 issues a write command for writing the page data in the first physical page to the flash memory module 106 and transmits the first portion of data of the first page data from the buffer memory 208 to the first buffer area 256a.

If it is determined that the error bit does not exist in the first portion of data of the first page data but exists in the second portion of data of the second page data, in step S2017, the memory management circuit 202 issues a write command for writing the page data in the first physical page to the flash memory module 106 and transmits the first portion of data of the first page data and the corrected second portion of data of the first page data from the buffer memory 208 to the first buffer area 256a.

If it is determined that the error bit does not exist in the second portion of data of the first page data but exists in the first portion of data of the second page data, in step S2019, the memory management circuit 202 issues a write command for writing the page data in the first physical page to the flash memory module 106 and transmits the corrected first portion of data of the first page data is transmitted from the buffer memory 208 to the first buffer area 256a.

If it is determined that the error bit exists in both the first and second portions of data of the first page data read from the first buffer area 256a, in step S2021, the memory management circuit 202 issues a write command for writing the page data in the first physical page to the flash memory module 106 and transmits the corrected first portion of data of the first page data and the corrected second portion of data of the first page data from the buffer memory 208 to the first buffer area 256a.

After receiving the write command, the flash memory module 106 moves the first portion of data and the second portion of data of the first page data in the first buffer area 256a into the second buffer area 256b and then programs the page data from the second buffer area 256b to the first physical page.

Accordingly, as described in the second exemplary embodiment, the speed of moving data can be increased, and the accuracy of the moved data can also be ensured.

As described in the exemplary embodiments, in the data moving method, the memory controller, and the memory storage apparatus, the valid page data that belongs to the same logical page and is dispersedly stored in a plurality of physical pages in the flash memory module can be effectively merged into one physical page. To be more specific, the data that belongs to the same logical page and is dispersedly stored in the physical pages is integrated in the data I/O buffer of the flash memory module and directly written into the physical page. Accordingly, the speed of moving the data can be effectively increased. Moreover, the data in each physical page need not be read and written into the buffer memory. Hence, the occupied storage space of the buffer memory is significantly reduced. Thereby, it is not necessary to apply the buffer memory with great capacity, thereby reducing manufacturing costs of the memory storage apparatus. Moreover, in the data moving method, the memory controller, and the memory storage apparatus described in another exemplary embodiment of the invention, the accuracy of the moved data can be further guaranteed. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data moving method for moving first page data stored in a flash memory module having a plurality of physical pages into a first physical page among the physical pages, wherein the flash memory module has a first buffer area, a capacity of the first buffer area is equal to a capacity of each of the physical pages, the first page data has a first portion of data and a second portion of data, the first portion of data is stored in a second physical page among the physical pages, the second portion of data is stored in a third physical page among the physical pages, the data moving method comprising:

(a) transmitting a first read command for reading page data stored in the second physical page to the flash memory module, wherein the flash memory module reads the page data stored in the second physical page into the first buffer area of the flash memory module in response to the first read command;

(b) reading the first portion of data of the first page data from the first buffer area into a buffer memory;

(c) transmitting a second read command for reading page data stored in the third physical page to the flash memory module, wherein the flash memory module reads the page data stored in the third physical page into the first buffer area of the flash memory module in response to the second read command;

(d) transmitting the first portion of data of the first page data from the buffer memory to the first buffer area; and (e) transmitting a write command for writing the first page data stored in the first buffer area into the first physical page to the flash memory module.

2. The data moving method as recited in claim 1, wherein the flash memory module further has a second buffer area, and the flash memory module moves the first page data stored in the first buffer area to the second buffer area and programs the first page data from the second buffer area to the first physical page in response to the write command.

3. The data moving method as recited in claim 1, wherein the flash memory module programs the first page data from the first buffer area to the first physical page in response to the write command.

4. The data moving method as recited in claim 1, wherein the step includes:
determining whether at least one error bit exists in the first portion of data of the first page data read from the first buffer area; and
when the at least one error bit exists in the first portion of data of the first page data read from the first buffer area, correcting the first portion of data of the first page data read from the first buffer area and transmitting the corrected first portion of data of the first page data from the buffer memory to the first buffer area.

5. The data moving method as recited in claim 1 further comprising:
reading the second portion of data of the first page data from the first buffer area;
determining whether at least one error bit exists in the second portion of data of the first page data read from the first buffer area; and
when the at least one error bit exists in the second portion of data of the first page data read from the first buffer area, correcting the second portion of data of the first page data read from the first buffer area and transmitting the corrected second portion of data of the first page data to the first buffer area.

6. The data moving method as recited in claim 1, wherein the first page data further has a third portion of data stored in a fourth physical page among the physical pages, and the data moving method further comprises:
after the step (b), transmitting a third read command for reading page data stored in the fourth physical page to the flash memory module, wherein the flash memory module reads the page data stored in the fourth physical page into the first buffer area of the flash memory module in response to the third read command;
reading the third portion of data of the first page data from the first buffer area into the buffer memory; and
after the step (c), transmitting the third portion of data of the first page data from the buffer memory to the first buffer area.

7. The data moving method as recited in claim 1, wherein the step (b) is performed while the flash memory module is being programmed.

8. The data moving method as recited in claim 1, wherein the capacity of each of the physical pages is 8 kilobytes, the size of the first page data is 8 kilobytes, and the size of the first portion data of the first page data and the size of the second portion data of the first page data are 4 kilobytes, respectively.

9. A memory controller for controlling a flash memory module, wherein the flash memory module have a plurality of physical pages and a first buffer area, a capacity of the first buffer area is equal to a capacity of each of the physical pages, the memory controller comprising:
a host interface, configured to be coupled to a host system;
a memory interface, configured to be coupled to the flash memory module;
a buffer memory; and
a memory management circuit, coupled to the buffer memory, the host interface, and the memory interface and configured to move first page data stored in the flash memory module to a first physical page among the physical pages,
wherein the first page data has a first portion of data and a second portion of data, the first portion of data is stored in a second physical page among the physical pages, the second portion of data is stored in a third physical page among the physical pages,
wherein the memory management circuit transmits a first read command for reading page data stored in the second physical page to the flash memory module,
wherein the flash memory module reads the page data stored in the second physical page into the first buffer area of the flash memory module in response to the first read command,
wherein the memory management circuit reads the first portion of data of the first page data from the first buffer area into the buffer memory,
wherein the memory management circuit transmits a second read command for reading page data stored in the third physical page to the flash memory module,
wherein the flash memory module reads the page data stored in the third physical page into the first buffer area of the flash memory module in response to the second read command,
wherein the memory management circuit transmits the first portion of data of the first page data from the buffer memory to the first buffer area,
wherein the memory management circuit transmits a write command for writing the first page data stored in the first buffer area into the first physical page to the flash memory module.

10. The memory controller as recited in claim 9, wherein the flash memory module further has a second buffer area, and the flash memory module moves the first page data stored in the first buffer area to the second buffer area and programs the first page data from the second buffer area to the first physical page in response to the write command.

11. The memory controller as recited in claim 9, wherein the flash memory module programs the first page data from the first buffer area to the first physical page in response to the write command.

12. The memory controller as recited in claim 9, wherein the memory management circuit determines whether at least one error bit exists in the first portion of data of the first page data read from the first buffer area, and
when the at least one error bit exists in the first portion of data of the first page data read from the first buffer area, the memory management circuit corrects the first portion of data of the first page data read from the first buffer area and transmits the corrected first portion of data of the first page data from the buffer memory to the first buffer area.

13. The memory controller as recited in claim 9, wherein the memory management circuit is further configured to read the second portion of data of the first page data from the first buffer area and determine whether at least one error bit exists in the second portion of data of the first page data read from the first buffer area, and when the at least one error bit exists in the second portion of data of the first page data read from the first buffer area, the memory management circuit corrects the second portion of data of the first page data read from the first buffer area and transmits the corrected second portion of data of the first page data to the first buffer area.

14. The memory controller as recited in claim 9, wherein the first page data further has a third portion of data stored in a fourth physical page of the physical pages, wherein the memory management circuit is further configured to transmit a third read command for reading a page data stored in the fourth physical page to the flash memory module, wherein the flash memory module reads the page data stored in the fourth physical page into the first buffer area of the flash memory module in response to the third read command, wherein the memory management circuit is further configured to read the third portion of data of the first page data from the first buffer area into the buffer memory, and wherein the memory management circuit is further configured to transmit the third portion of data of the first page data from the buffer memory to the first buffer area.

15. The memory controller as recited in claim 9, wherein while the flash memory module is being programmed, the memory management circuit transmits the first read command of reading the page data stored in the second physical page to the flash memory module, reads the first portion of data of the first page data from the first buffer area into the buffer memory, transmits the second read command for reading the page data stored in the third physical page to the flash memory module, and transmits the first portion of data of the first page data from the buffer memory to the first buffer area.

16. The memory controller as recited in claim 9, wherein the capacity of each of the physical pages is 8 kilobytes, the size of the first page data is 8 kilobytes, and the size of the first portion data of the first page data and the size of the second portion data of the first page data are 4 kilobytes, respectively.

17. A memory storage apparatus comprising:

a flash memory module, having a plurality of physical pages and a first buffer area, wherein a capacity of the first buffer area is equal to a capacity of each of the physical pages;

a connector, configured to be coupled to a host system;

a memory controller, having a buffer memory and coupled to the flash memory module and the connector, wherein the memory controller is configured to move first page data stored in the flash memory module to a first physical page among the physical pages, wherein the first page data has a first portion of data and a second portion of data, the first portion of data is stored in a second physical page among the physical pages, and the second portion of data is stored in a third physical page among the physical pages, wherein the memory controller transmits a first read command for reading page data stored in the second physical page to the flash memory module, wherein the flash memory module reads the page data stored in the second physical page into the first buffer area of the flash memory module in response to the first read command, wherein the memory controller reads the first portion of data of the first page data from the first buffer area into the buffer memory, wherein the memory controller transmits a second read command for reading page data stored in the third physical page to the flash memory module, wherein the flash memory module reads the page data stored in the third physical page and writes the page data into the first buffer area of the flash memory module in response to the second read command, wherein the memory controller transmits the first portion of data of the first page data from the buffer memory to the first buffer area, wherein the memory controller transmits a write command for writing the first page data stored in the first buffer area into the first physical page to the flash memory module.

18. The memory storage apparatus as recited in claim 17, wherein the flash memory module further has a second buffer area, and the flash memory module moves the first page data stored in the first buffer area to the second buffer area and programs the first page data from the second buffer area to the first physical page in response to the write command.

19. The memory storage apparatus as recited in claim 17, wherein the flash memory module programs the first page data from the first buffer area to the first physical page in response to the write command.

20. The memory storage apparatus as recited in claim 17, wherein the memory controller determines whether at least one error bit exists in the first portion of data of the first page data read from the first buffer area, and when the at least one error bit exists in the first portion of data of the first page data read from the first buffer area, the memory controller corrects the first portion of data of the first page data read from the first buffer area and transmits the corrected first portion of data of the first page data from the buffer memory to the first buffer area.

21. The memory storage apparatus as recited in claim 17, wherein the memory controller is further configured to read the second portion of data of the first page data from the first buffer area and determines whether at least one error bit exists in the second portion of data of the first page data read from the first buffer area, and when the at least one error bit exists in the second portion of data of the first page data read from the first buffer area, the memory controller corrects the second portion of data of the first page data read from the first buffer area and transmits the corrected second portion of data of the first page data to the first buffer area.

22. The memory storage apparatus as recited in claim 17, wherein the first page data further has a third portion of data stored in a fourth physical page of the physical pages, wherein the memory controller is configured to transmit a third read command for reading a page data stored in the fourth physical page to the flash memory module, wherein the flash memory module reads the page data stored in the fourth physical page and writes the page data into the first buffer area of the flash memory module in response to the third read command, wherein the memory controller is configured to read the third portion of data of the first page data from the first buffer area into the buffer memory, and wherein the memory controller is further configured to transmit the third portion of data of the first page data from the buffer memory to the first buffer area.

23. The memory storage apparatus as recited in claim 17, wherein while the flash memory module is being programmed, the memory controller transmits the first read command for reading the page data stored in the second physical page to the flash memory module, reads the first portion of data of the first page data from the first buffer area into the buffer memory, transmits the second read command for reading the page data stored in the third physical page to the flash memory module, and transmits the first portion of data of the first page data from the buffer memory to the first buffer area.

24. The memory storage apparatus as recited in claim 17, wherein the capacity of each of the physical pages is 8 kilobytes, the size of the first page data is 8 kilobytes, and the size of the first portion data of the first page data and the size of the second portion data of the first page data are 4 kilobytes, respectively.

* * * * *